United States Patent Office 2,804,615
Patented Aug. 27, 1957

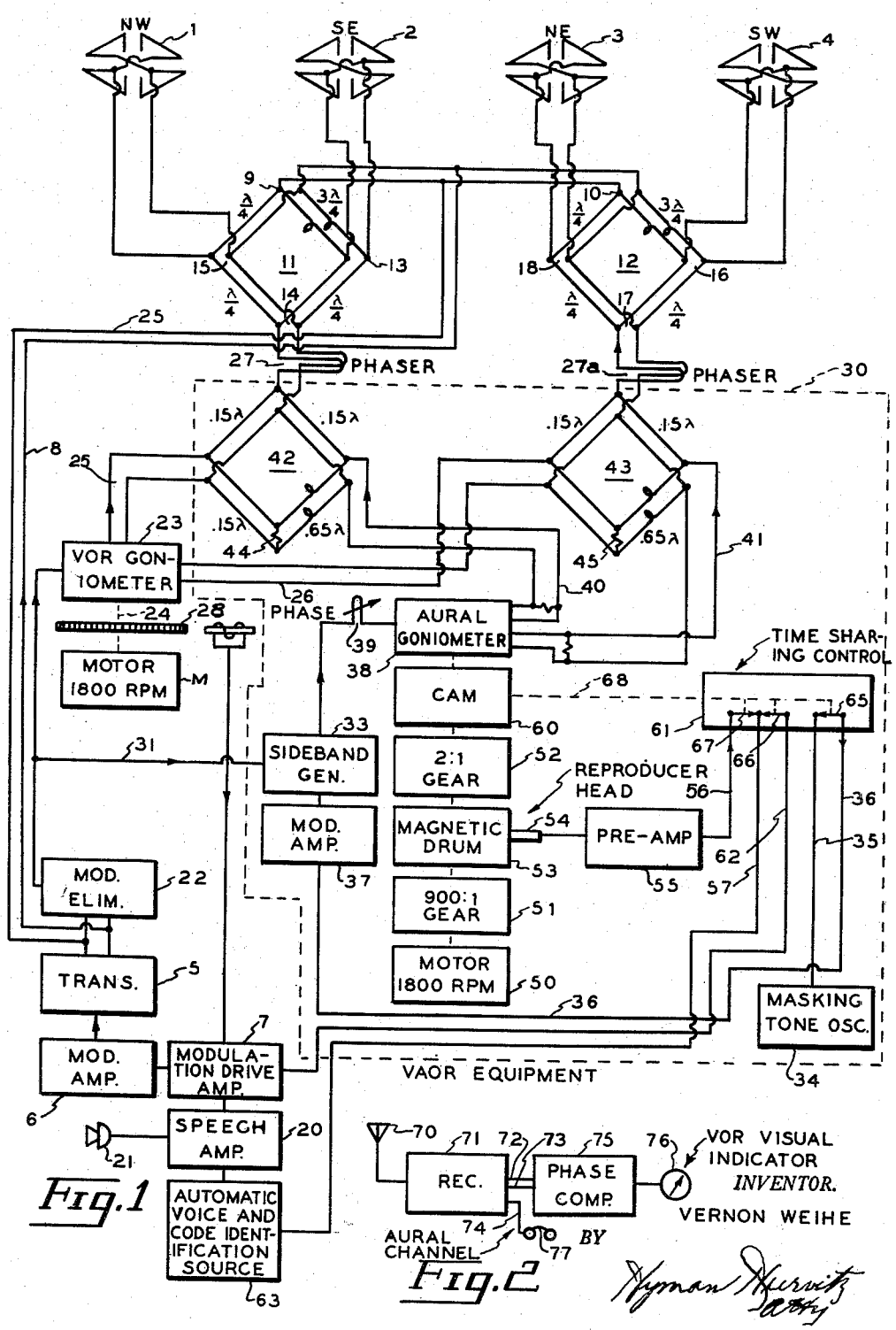

2,804,615

NAVIGATIONAL SYSTEM

Vernon I. Weihe, Arlington, Va., assignor, by mesne assignments, to Westinghouse Air Brake Company, a corporation of Pennsylvania Application September 8, 1953, Serial No. 378,797

19 Claims. (Cl. 343—106)

The present invention relates generally to omni-range systems, for aircraft and other vehicles, and more particularly to systems for simultaneously visually and aurally indicating aboard aircraft or other vehicles, bearing from a ground transmitting station.

Within the past ten years the so-called VHF (very high frequency) omni-range (VOR) has been internationally adapted by the fifty-eight states of the International Civil Aviation Organization, for use by aircraft. Hundreds of ground equipments have been installed, and are in operation, and tens of thousands of airborne equipments have been installed, and are in operation.

The specifications which have been adopted internationally, relating to omni-range systems, include the following. The ground equipment must radiate a radio frequency carrier with which are associated two separable 30 cycle per second modulations. One of these modulations shall be such that its phase is independent of the azimuth of the point of observation. This phase is denominated the "reference" phase. The other modulation shall be such that its phase at the point of observation differs from that of the reference phase by an angle equal to the bearing of the point of observation with respect to the ground transmitter. The reference phase shall be carried by a sub-carrier of 9960 C./S. of constant amplitude, frequency modulated at 30 C./S. The signal of variable phase shall be due to a rotating field pattern.

If the VHF omni-directional radio range (VOR) provides a simultaneous communication channel ground-to-air, this shall be on the same radio frequency carrier as used for the navigational function. Identification signals must be provided, transmitted on the same carrier, in alternation to the speech. The system must be such, however, that transmission of speech or identification signal shall not interfere in any way with the basic navigational function.

It is also provided that each VOR shall be monitored, and that the monitor system shall transmit a warning, and remove the bearing information component from the transmitted carrier, under certain conditions, and that this removal shall also take place if the monitor itself fails.

Any system of improvement of the VOR system, must, if it is to be adopted, adhere to the above specifications, and features added to presently available VOR systems must not involve a deviation from these specifications.

It has been found, in the course of extensive use of VOR systems, that the receivers of the system are subject to partial failure conditions, which cause them to provide erroneous information. Such failure is extremely hazardous navigationally.

From an operational standpoint, two major deficiencies exists, when a receiver malfunctions. (1) The pilot may think he is on the right hand side of an airway, when in fact he is on the left hand side. (2) Navigational error produces risk of crash when operating near fixed obstacles or high terrain.

In accordance with the present invention, I provide supplementary equipment at the VOR ground station, which provides an aural signal to the pilot of an aircraft, to enable a direct check on the accuracy of his airborne receiving equipment, and, if desired, certain supplementary information may be provided by the aural signal. Briefly describing the concept employed, I transmit omnidirectionally aural signal which provides navigational information at discrete time intervals. I transmit, in addition, a directional pattern of energy, aurally modulated with masking tone, and having a rotating null, rotation of the null being synchronized with the aural transmissions so that aural transmissions may be received free of masking signal only at bearings such that the aural transmissions are navigationally pertinent.

The pilot hears the masking signal at all times except when the null is at his bearing. At that time the masking signal becomes inaudible, and the aural information alone thereby becomes audible. Due to the synchronization of the aural information with the rotation of the null, when the aural signal becomes solely audible it is pertinent to the bearing of the null, and hence to the azimuthal bearing of the receiving craft.

To provide a concrete example, if the aural signal were to count degrees of azimuth by 5° increments from magnetic zero, at one second intervals, counting around the compass would require 72 counts, or 72 seconds. If the null rotated once in 72 seconds, in synchronism with the count, the pilot would hear the count free of masking time only while he was at the bearing counted. All other counts would be masked. The aural beacon would thus present a check on the VOR visual indicator, at least as to gross errors in its indication.

The addition of an aural beacon, of the type indicated, provides a stand-by navigational service in the event of failure of the visual portion of the VOR receiver, as well as a check on its accuracy, and the system may be employed to provide information aurally, which is supplementary to the bearing count for a given hearing, such as (a) the bearings of airway center-lines or runway extensions, and (b) alerting service in certain azimuthal sectors wherein exist radio antennas, tall buildings, and the like obstacles, or restricted areas.

The supplementary aural beacon hereinabove described has been denominated VAOR, the letter A added to the usual abbreviation VOR, hereinabove defined, indicating Audio.

The VAOR provides a facility additional to the VOR, without interfering with the latter. The VOR facility code and voice identification may be time shared with this VAOR service, and the VAOR may be provided with its own fail-safe monitor.

It is, accordingly, an object of the present invention to provide a gross error detector for an omni-range beacon system.

It is a further object of the invention to provide an aural omni-range beacon supplementary to a visual omni-range beacon, and on the same carrier frequency therewith.

It is still another object of the present invention to provide an aural omni-range beacon which utilizes the aural channel of a visual omni-range beacon system to transmit azimuthal information aurally.

A further object of the invention resides in the provision of a system of aural omni-range beaconing wherein aural information of navigational significance is transmitted omni-directionally, together with a directional rotating masking signal which permits unmasked reception of the aural information only intermittently, the rotation of the masking signal being so synchronized with the content of the aural information, that when the latter is received free of the masking signal, at a given azimuth, the aural information is significant of that azimuth.

A further object of the invention resides in the provision of a novel masking signal for an omni-directional transmission.

A more specific object of the invention is the provision of a rotating directional pattern of carrier-suppressed side band energy as an aural masking signal for an omni-directional aurally modulated carrier, wherein an aural masking tone is developed by inter-modulation of the omni-directional carrier and the rotating pattern of the side band energy.

The above and still further features, objects and advantages of the invention will become apparent upon consideration of the following detailed disclosure of a specific embodiment of the invention, especially when taken in conjunction with the accompanying drawings, wherein:

Figure 1 is a functional block diagram of a VOR transmitter and a VAOR supplementary service, in accordance with the invention.

Figure 2 is a functional block diagram of a VOR receiver, of the type carried aboard aircraft.

Referring now more particularly to the accompanying drawings, the reference numerals 1, 2, 3, 4 denote respectively horizontally polarized Alford loop antennae, which have omni-directional radiation patterns, and which are located geographically on the NW, SE, NE and SW corners of an imaginary rectangle. The antennas 1, 2, 3, 4 are supplied with modulated carrier from a transmitter 5, having a modulator or power amplifier 6 and a modulation driver amplifier 7. Ignoring for the moment the character of the modulation, the output of the transmitter 5 is supplied via two conductor line 8, jointly to corresponding terminals 9, 10 of two bridge circuits 11, 12. While two conductor R. F. lines are illustrated, for simplicity, co-axial cable is actually employed.

The bridge 11 is provided with four terminals 9, 13, 14, 15, taken clockwise about the bridge, the terminals 9, 13 being separated by a path which is 3λ/4 in length at the frequency of the carrier, and the remaining pairs of adjoining terminals being separated by paths which are λ/4 at the same frequency. The bridge 12 duplicates the bridge 11, and its terminals are denoted, taken clockwise from terminal 10, by the numerals 16, 17, 18. The antenna 1 is connected to terminal 15, the antenna 2 to terminal 13, the antenna 3 to terminal 18 and the antenna 4 to terminal 16. The connections to the antennas being all of identical electrical length, it will be clear that antennae 1, 2 would be fed from line 8 in opposite phase, and the antennae 3, 4 in opposite phase, and that antennae 1, 3 would be driven in phase and antennae 2, 4 in phase, were there no cross-overs. However, the feed connections at antenna 1 are crossed, with respect to those at antenna 2. Similarly, the feed connections at antenna 3 are crossed, with respect to those at antenna 4. So that the antenna pair 1, 2 is fed co-phasally from line 8, as is antenna pair 3, 4.

If the modulation driver 7 be then driven from a speech amplifier 20 and microphone 21, the structure specifically described will be capable of transmitting the speech input to the microphone 21, substantially omni-directionally, as modulation on the carrier provided by transmitter 5. The carrier itself will be transmitted, in the absence of spech input to the microphone 21.

The output of transmitter 5 may be passed through a modulation eliminator 22, which may take the form of a sufficiently narrow band filter that at its output is present only the carrier supplied by transmitter 5.

The output of modulation eliminator 22 is supplied to the input of a goniometer 23, which essentially is a mechanical modulator, capable of sinusoidally modulating the carrier in response to rotation of a shaft 24. The goniometer 23 includes two modulator elements operative at 90° phase difference of the rotary speed of drive shaft 24, the separate modulated carriers being supplied to leads 25, 26, respectively. The shaft 24 is driven by a motor M, at a speed of 1800 R. P. M., or 30 R. P. S., and the structure of the modulators is such that one cycle of modulation corresponds with one complete rotation of shaft 24. The modulation frequency of the carriers on lines 25 and 26 is therefore identical, at 30 C./S., and the relative phase of the modulation is also locked. Reference is made to CAA Technical Report 113, of June 1950, for complete details concerning the goniometer 23.

In the normal operation of the VOR the signal on the lead 25, would be applied contra-phasally to antenna pair 1, 2, via a phase adjuster 27, and the signal on the lead 26 correspondingly applied contra-phasally to antenna pair 3, 4 via a phase adjuster 27a. The radiation pattern from each of the pairs of antennae 1, 2 and 3, 4, being contra-phasal at carrier frequency, is a figure of eight, and the separate patterns being modulated in amplitude in 90° phase relation at a frequency of 30 C./S., provide together a figure of 8 pattern which rotates in azimuth at 30 R. P. S.

The shaft 24 bears a sonic wheel 28, having about its periphery a plurality of protuberances formed of magnetic material. The periphery of the wheel 28 is adjacent a stationary pick-up coil 29, output from which is supplied to modulation driver 7, as a modulating signal. The number of protuberances is so selected, and the protuberances are so shaped, that the signal input to the modulation driver 7 is a 9960 C./S. sub-carrier modulated in frequency at 30 C./S., and this frequency, being applied directly as a modulation frequency to transmitter 5, and transmitted omni-directionally, provides a reference phase, i. e. a signal of identical phase in all directions azimuthally of the antennae 1, 2, 3, 4. The directional transmissions, rotating at 30 R. P. S., provide a 30 C./S. signal, having phase dependent on the direction from which they are received. Details concerning the sonic wheel 28 are supplied in CAA Technical Development Report No. 200.

Reception of both 30 C./S. signals, in separate channels, and their subsequent phase comparison, at a vehicle located remotely from antennae 1, 2, 3, 4, results then in a determination of bearing of the vehicle with respect to the antennae.

So much is per se known, and is not my invention, but describes the standard VOR.

In accordance with the present invention, that equipment which is functionally represented within the dashed block 30, is added to the standard VOR, represented externally of the dashed block 30, to provide an additional service. The additional equipment must have the property of requiring no modification of the basic VOR, or of its operation beyond the provision of facilities for introducing additional signals. It must also possess the property that the VOR receiver is capable of receiving the signals representative of the additional service.

The carrier employed to transmit the auxiliary audio signal is the VOR carrier, and is derived from the output of the modulation eliminator 22, via a line 31. The carrier on the line 31 is applied to a carrier suppressed modulator 33, to which is also applied 1020 C./S. tone signal from an oscillator 34, via leads 35, 36, and modulation amplifier 37. The output of the modulator 33, herein sometimes denominated a side band generator, consists of the VOR carrier frequency ±1020 C./S.

These two side band frequencies are applied to an aural goniometer 38 which is similar to the VOR goniometer 23, in general concept and structure, serving to split the incoming signal into two channels, and to amplitude modulate the signals in the two channels in 90° relative phase. The frequency of modulation, in the case of the VOR goniometer 23 is 30 C./S. In the case of the aural goniometer 38, the modulation frequency is set at one cycle per minute, and the signals modulated in the separate channels is the double side band input to the audio goniometer. The two output channels are denominated respectively 40 and 41.

The auxiliary equipment 30 includes two isolating hybrid bridges 42, 43. The lines 25, 40 are applied, respectively, to diagonally opposite corners of the bridge 42, while the lines 26, 41 are applied, respectively, to diagonally opposite corners of the bridge 43. Thereby the aural goniometer 38 is isolated from the VOR goniometer 23, and each operates as if the other were absent. The remaining diagonally opposite corners of the bridge 42 are connected, respectively, to phaser 27, and terminated by resistance 44. The remaining diagonally opposite corners of the bridge 42 are connected, respectively, to phaser 28 and to terminating and balancing resistance 45.

Accordingly, the outputs of both goniometers are applied similarly to the antenna pairs 1, 2 and 3, 4, and the output of the aural goniometer 38 generates in space rotating side bands, the frequency of the side bands being equal to the frequency of the VOR transmitter ±1020 C./S., and the rate of rotation being one R. P. M. An ordinary receiver will, then, intercept the omni-directional carrier supplied by the VOR transmitter, and the rotating side bands supplied by the aural goniometer 38, and the former serving as a local oscillator frequency for the latter, and generates in the receiver output at the difference frequency, or 1020 C./S. This output signal is available, however, only when the receiver is in the field of the rotating pattern deriving from the aural goniometer 38. Since this rotating pattern has a rotative frequency of one R. P. M., and since the antenna patterns are figure-of-eight, the receiver will be in a null twice during each rotation of the pattern, i. e. once each thirty seconds, and at all other times will receive and detect the 1020 C./S. tone, hereinafter denominated "masking" tone.

The aural goniometer 38 is driven from a motor 50, rotating at 1800 R. P. M., via two stages of reduction gearing, gearing 51 having a reduction ratio of 900:1 and reduction gearing 52 of 2:1, thus reducing the rotative velocity of the aural goniometer to one R. P. M. The gearing 51 drives a magnetic drum 53, which rotates at 2 R. P. M., and which is provided with a reproducer head 54, and a suitable audio pre-amplifier 55.

The output of the pre-amplifier 55 is supplied via leads 56, 57 to the modulation driver 7, so that the material recorded on the magnetic drum 53 may be broadcast omni-directionally, just as would speech originating in the microphone 21. This material may in fact, in a preferred embodiment of the present invention, be speech, and be constituted of information of navigational significance, such as (1) the azimuth of the null of the aural rotating pattern (2) supplementary information pertinent to this azimuthal direction, such as the presence of runways, obstacles, and the like.

It will be clear that the information deriving from the magnetic drum 53 is receivable aboard a vehicle at any and all azimuthal bearings, with respect to the VOR antennae. The "masking" tone, however, masks the audio information, or is superposed thereon, at all times, except those times during which the vehicle is in a null of the rotating pattern, deriving from the aural goniometer, at which times the "masking" tone is not received, and the audio informations permitted to come through free of the masking tone. It follows that audio information is available aboard the vehicle which is pertinent to the azimuthal direction of the vehicle, with a 180° ambiguity.

The 180° ambiguity arises because the radiation pattern of the antennae is figure-of-eight. The magnetic drum 53 is rotated at twice the velocity of the figure-of-eight pattern, and the recording thereon is a count of degrees, by 5° intervals, for example only, to 180°. The ambiguity is resolved for any vehicle by its normal VOR indication, or by other information available to the pilot, if the VOR indicator is inoperative. The aural indication is sufficiently accurate to provide a check on the operation of the VOR indicator, should the latter be grossly in error.

The internationally accepted specification for VOR equipments requires the transmission of identification from each VOR, at intervals. In the present system this information would be masked by the "masking" tone, for the major portion of transmitting time. Transmission of identification signals is enabled, however, by a time sharing process, the "masking" tone and the navigational information deriving from the magnetic drum 53 being transmitted for 180° of rotation of the radiation pattern, and identification signals for the remaining 180°. To this end the gearing 52 drives a switch actuating cam 60, which actuates a time sharing control 61, hereinafter more fully described. The time sharing control 61 has two alternative and successive operative conditions, timed by the cam 60, these conditions being as follows. (1) Lead 56 is connected to lead 57 and lead 35 to lead 36. (2) Lead 56 is disconnected from lead 57 and lead 35 from lead 36, and connection is made between lead 57 and a lead 62, which connects with a source 63 of automatic voice and code identification.

The time sharing control 61 is so adjusted that condition (1) commences prior to the time a null of the one R. P. M. rotating pattern of rotation reaches North, and continues until after this null passes South. Condition (2) obtains during the remaining period of time. The timing is thus such that the pilot has available aural information, on one null, from N to S, and on the remaining null from S to N. The entire 360° of azimuth is thus provided both navigational information and identification information, during one rotation of the VAOR directional radiation pattern.

Referring now more specifically to the time sharing control 61, it consists of three switches 65, 66, 67, operated from the cam 60, the mechanical linkage required being indicated by the dash line 68. The switch 65 is closed while the VAOR rotating pattern rotates from 350° to 190°, North being taken at 0°, and these values being preferred but not critical or essential. For the remainder of the rotation switch 65 is open. Thereby 1020 C./S. masking tone is transmitted during sweep of the VAOR pattern from 350° to 190°, and is then absent from the transmission during the remaining sweep.

Switch 66 is retained closed while switch 65 is open, and vice versa, so that in the absence of masking tone, i. e., during sweep of the VAOR rotating pattern from 190° to 350°, signals are transmitted from automatic voice and code identification source 63.

Switch 67 is kept closed concurrently with switch 65, i. e. during transmission of masking tone, and makes available the navigational information previously recorded on magnetic drum 53, and supplied to lead 56.

The theory on which is based the design and operation of hybrid bridges 42, 43, is provided in an article by Tyminski, entitled Hybrid Ring for UHF, in Proceedings of the Institute of Radio Engineers for January, 1953.

Turning now to Figure 2 of the accompanying drawings, there is illustrated, in functional block diagram, a conventional VOR receiver-indicator, further details being available in CAA Technical Report 113, of June 1950. The VOR receiver-indicator of Figure 2 is installed aboard an aircraft, and comprises basically a receiving antenna 70, a receiver 71 suitable for operation at the frequencies involved, and three output channels, 72, 73, 74. Channels 72, 73 carry, respectively, the two 30 C./S. signals of invariable phase and azimuth representative phase, transmitted by the VOR equipment of Figure 1, and supply these to a phase comparator 75, the output of which is indicated by means of a visual indicator 76, calibrated in terms of bearing.

The output channel 74 is the aural channel, which normally conveys speech signals, and automatic voice and identification signals, transmitted by the VOR, to phones 77. The same aural channel, and phones 77, in any event present, are utilized to indicate aurally the aural bearing information deriving from magnetic drum 53; and the masking tone deriving from masking tone oscillator 34. The addition of a VAOR service, to the normal VOR transmitter equipment, requires then no supplementary equipment at the receiver-indicator.

Reviewing now briefly the operation of the present system, the VOR equipment transmits on omni-directional carrier, which, in normal VOR operation may be modulated by speech signals deriving from microphone 21, or by audible signals deriving from automatic voice and code identification source 63. These signals are received aboard an aircraft, and translated into an aural channel 74.

The VAOR supplementary information is transmitted via the equipment normally available in the VOR equipment, for aural transmissions, i. e. on the omni-directional carrier used to convey aural information, in normal VOR operation. The VOR and VAOR share this facility, on a time basis. The VAOR transmissions consist of a count of degrees of azimuth, supplemented, if desired, by information pertinent to any bearing or bearings. The count, and the supplementary information, are read from a magnetic drum 53, by a reproducer 54, being pre-recorded on magnetic drum 53 at a fixed rate of count. Synchronously with the count, a figure-of-eight pattern is rotated, at carrier frequencies so offset from the VOR carrier that intermodulation of the carriers results in a masking tone, at some convenient audio frequency. The figure of eight pattern is generated by the VOR antennae, which are coupled to the VAOR by means of hybrid networks, 42, 43. These prevent interaction between the VOR and the VAOR.

To generate the VAOR rotating figure-of-eight pattern the output of a masking tone generator 34 is applied to a side band generator 33, and the side bands modulated in 90° relative phase at a rate of one R. P. M. by aural goniometer 38. The two outputs, modulated in 90° relative phase, are applied to antenna pairs 1, 2 and 3, 4 in R. F. phase relation suitable to generate the required phase pattern, by means of phase shift and isolating bridges 11, 12.

The aural goniometer 38, the magnetic drum 53, and the switching cam 60 which controls time sharing as between the VOR and VAOR facilities are driven from a single drive motor 50, via appropriate gearings, so that the phasings and timings required are locked.

The masking tone is audible in the aural channel 74 of the VOR receiver, when the VAOR is transmitting, as is also the aural information deriving from the magnetic drum 54, at all azimuthal bearings except that in which exists the null of the VAOR figure-of-eight pattern. On that bearing, and on that bearing only, the aural information is heard free of masking tone. Accordingly, and by virtue of suitable synchronization of the masking tone pattern and the control of the aural information, when aural information is received, free of masking tone, aboard a craft, that aural information is pertinent to the actual bearing of the craft relative to the VOR.

While I have described and illustrated one specific and preferred embodiment of my invention, I realize that variants and modifications, both in detail and general arrangement may be resorted to without departing from the true spirit and scope of the invention, as defined in the appended claims.

I claim:

1. In a radio beacon system, wherein is provided means for transmitting a first signal of identical phase omni-directionally and a further signal having a phase which is a function of azimuthal direction, and a remote visual indicator means for indicating the relative phases of said first and further signals, the provision of a transmitter for transmitting a second aural beacon signal indicative of said azimuthal directions, said first and second signals utilizing a common carrier frequency.

2. The combination in accordance with claim 1 wherein said second aural beacon signal is composed of an aural signal transmitted omni-directionally and a rotating-directive pattern of radiation having at least one rotating null.

3. The combination in accordance with claim 1 wherein said second aural beacon signal is composed of an aural signal transmitted omni-directionally and a rotationally directive control signal for masking said aural signal in successively different bearings from said means for transmitting.

4. In a radio beacon system wherein is transmitted as modulation of a carrier wave a first signal having identical phase omni-directionally, and a second signal having a phase which is a function of azimuthal direction, for reception aboard a remote vehicle, and wherein said remote vehicle is provided with receiver means for receiving said first and second signals and supplementary aural signals, and wherein said receiver is provided with means for visually indicating the relative phases of said first and second signals, the combination of a supplementary aural beacon comprising means for transmitting aural information omni-directionally via said carrier, and means for transmitting a rotary pattern of radiant energy having a frequency separated from the frequency of said carrier by an audio frequency, said rotary pattern comprising at least one rotary null, and means for synchronizing the content of said aural information with the position of said at least one null.

5. The combination in accordance with claim 4 wherein said rotary pattern is a figure-of-eight pattern.

6. The combination in accordance with claim 4 wherein said rotary pattern is a figure-of-eight pattern, and wherein means is provided for interrupting said rotary pattern during less than 180° of its rotation and more than 30° of its rotation.

7. In a radio beacon system wherein is provided a source of carrier frequency, means comprising an antenna system coupled to said source of carrier frequency, said means arranged and adapted to transmit a rotating directional pattern of radiation at a first relatively high rate of rotation, a receiver-indicator aboard a craft remote from said source of carrier frequency, said receiver-indicator including visual means responsive to said rotating directional pattern of radiation for indicating bearing of said craft with respect to said antenna system, said receiver-indicator further comprising an aural channel, the combination of a reproducible record containing aural information having navigational significance, means for reproducing said aural information from said record, and means for selectively making available to said aural channel as a sole signal only that portion of the reproduced aural information which is pertinent to the bearing of said craft.

8. The combination in accordance with claim 7 wherein said last means includes means for transmitting said aural information omni-directionally, and means for transmitting an aural masking signal at each bearing except during such time as said aural information is pertinent to that bearing.

9. The combination in accordance with claim 7 wherein said last means includes means for transmitting said aural information omni-directionally, and means for transmitting a rotating directional pattern of radiant energy at a frequency offset from said carrier frequency by an audio frequency, said directional pattern having a rotating null which bears at all times in a direction for which the aural information concurrently transmitted is pertinent.

10. In a radio beacon system, wherein is provided a modulatable transmitter having a predetermined carrier frequency, means responsive to said transmitter for transmitting a first signal at a relatively low frequency of equal phase omni-directionally and a further signal at said relatively low frequency and having a phase which is a function of azimuthal bearing from said transmitter, a receiver-indicator having a receiver tuned to said predetermined carrier frequency for detecting said first and further signal, a visual phase indicator responsive to the relative phases of said first and further signals, and an aural output channel, the combination of a reproducible record of navigationally pertinent aural information, means for periodically reproducing said navigationally pertinent information from said record, means for modulating said modulatable transmitter in response to said reproducer, means responsive to said transmitter for transmitting a rotating directive radiation pattern having a directive component synchronized bearing-wise with said means for periodically reproducing said navigationally pertinent information.

11. The combination in accordance with claim 10 wherein said directive component is a null.

12. The combination in accordance with claim 10 wherein said rotating directive radiation pattern is a figure-of-eight pattern and said directive component is a pair of oppositely directed nulls.

13. In a radio beacon system wherein is provided a transmitter having a predetermined carrier frequency, means for transmitting said carrier frequency in an omni-directional radiation pattern, a source of fixed frequency, means for transmitting said fixed frequency in identical phase omni-directionally via said omni-directional radiation pattern, and means for transmitting said carrier frequency in a directional radiation pattern having a frequency of rotation equal to said fixed frequency, the combination of a reproducibly recorded source of aural informational units pertinent each to a different azimuthal bearing, a reproducer for reproducing said informational units from said recorded source in time succession, means for transmitting the reproduced informational units omni-directionally on said carrier frequency, means for transmitting a further rotating directional radiation pattern on a frequency adjacent said carrier frequency, and means for synchronizing the instantaneous bearing of an element of said further rotating directional radiation pattern with the content of the contemporaneously transmitted aural information unit.

14. The combination in accordance with claim 13 wherein said element of said further rotating directional radiation pattern is a null in said pattern.

15. In a radio beacon system, wherein is provided a transmitter having a predetermined carrier frequency, and an antenna system, means interconnecting said transmitter and said antenna system so as to transmit an omni-directional radiation pattern at said carrier frequency, means interconnecting said transmitter and said antenna system so as to transmit a rotating directional radiation pattern at said carrier frequency, means for modulating said omni-directional radiation pattern at a fixed sub-audible rate, and means for establishing the rate of rotation of said rotating directional radiation pattern at said sub-audible rate in invariable phase relation to said modulation of said omni-directional radiation pattern, the combination of a reproducible record of aural informational units pertinent each to a different azimuthal bearing, a reproducer for reproducing said informational units from said reproducible record in time succession, means responsive to the output of said reproducer for modulating said omni-directional radiation pattern, and means for transmitting via said antenna system a supplementary directional radiation pattern having a directional element at successive instants of time which corresponds with the content of the informational units transmitted omni-directionally at those instants of time.

16. The combination in accordance with claim 15 wherein said directional element is a null.

17. The combination in accordance with claim 15 wherein said supplementary directional radiation pattern is a figure-of-eight pattern and wherein said directional element is a null.

18. The combination in accordance with claim 15 wherein said supplementary directional radiation pattern comprises at least one side band offset in frequency from said predetermined carrier frequency by an audio frequency separation, wherein said supplementary radiation pattern is a figure-of-eight pattern, and wherein said directional element is a null.

19. In a radio beacon system, wherein is provided a transmitter having a predetermined carrier frequency, a plurality of antennas, means interconnecting said transmitter and said antennas to transmit an omni-directional radiation pattern, means for modulating said omni-directional radiation pattern at a fixed frequency of substantially thirty cycles per second, and a fixed phase, means for further modulating said omni-directional radiation pattern in amplitude in response to an aural frequency, means interconnecting said transmitter and said antennas so as to transmit a rotating radiation pattern rotating at thirty cycles per second in phase fixed with respect to the phase of said first mentioned signal, the combination of a source of a repetitive plurality of aural informations, said informations pertinent in succession to different azimuthal bearings, means for modulating said omni-directional radiation pattern in response to said source of a repetitive plurality of aural informations, means for transmitting via said antennas a rotating directional radiation pattern synchronized in instantaneous bearing with the content of said aural informations.

References Cited in the file of this patent

UNITED STATES PATENTS

| | | |
|---|---|---|
| 1,815,246 | Englund | July 21, 1931 |
| 1,933,248 | Evans et al. | Oct. 31, 1933 |
| 2,279,031 | Cockerell et al. | Apr. 7, 1942 |
| 2,253,958 | Luck | Aug. 26, 1942 |
| 2,424,079 | Dome | July 15, 1947 |

FOREIGN PATENTS

| | | |
|---|---|---|
| 467,013 | Great Britain | June 9, 1937 |